Sept. 12, 1961     G. B. ANDERSON ET AL     2,999,403
AXLE RECENTERING MACHINE
Filed June 26, 1959     9 Sheets-Sheet 1

FIG. 1.

INVENTORS
GEORGE B. ANDERSON AND
FRANCIS E. COMPTON
BY
Attorney

FIG. 2.

INVENTORS
GEORGE B. ANDERSON AND
FRANCIS E. COMPTON

Sept. 12, 1961  G. B. ANDERSON ET AL  2,999,403
AXLE RECENTERING MACHINE

Filed June 26, 1959  9 Sheets-Sheet 3

FIG. 3

INVENTORS
GEORGE B. ANDERSON AND
FRANCIS E. COMPTON
BY
Attorney

INVENTORS
GEORGE B. ANDERSON AND
FRANCIS E. COMPTON
BY
Attorney

Sept. 12, 1961 G. B. ANDERSON ET AL 2,999,403
AXLE RECENTERING MACHINE
Filed June 26, 1959 9 Sheets-Sheet 5

INVENTORS
GEORGE B. ANDERSON AND
FRANCIS E. COMPTON
BY
*[signature]*
Attorney

Sept. 12, 1961 G. B. ANDERSON ET AL 2,999,403
AXLE RECENTERING MACHINE
Filed June 26, 1959 9 Sheets-Sheet 7

INVENTORS
GEORGE B. ANDERSON AND
FRANCIS E. COMPTON
BY
Attorney

Sept. 12, 1961  G. B. ANDERSON ET AL  2,999,403
AXLE RECENTERING MACHINE
Filed June 26, 1959  9 Sheets-Sheet 8

INVENTORS
GEORGE B. ANDERSON AND
FRANCIS E. COMPTON
BY
Attorney

Sept. 12, 1961     G. B. ANDERSON ET AL     2,999,403
AXLE RECENTERING MACHINE Filed June 26, 1959     9 Sheets-Sheet 9

INVENTORS
GEORGE B. ANDERSON AND
FRANCIS E. COMPTON
BY
*Attorney*

United States Patent Office 2,999,403
Patented Sept. 12, 1961

2,999,403
AXLE RECENTERING MACHINE
George B. Anderson and Francis E. Compton, Rochester, N.Y., assignors to Consolidated Machine Tool, division of Farrel-Birmingham Company, Inc., Rochester, N.Y., a corporation of Connecticut
Filed June 26, 1959, Ser. No. 823,235
7 Claims. (Cl. 77—18)

The present invention relates to machines for machining centering holes in rotary parts. More particularly the invention relates to a machine for centering and recentering railroad car wheel axles.

A railroad car wheel axle has the fits or journals for the antifriction or other bearings, by which it is supported, adjacent the collars at the very ends of the axle. Whether the axle is a new axle, or is an axle which has had extensive use and which requires remachining in order to use it further, its bearing fits or journals, and its dust guard fits or seats, and its wheel fits or bearings have to be turned or machined in a lathe or other machine tool in order that they may properly fit the parts which are to be mounted on them, respectively. The axle collars are, however, so narrow that the axle can not be supported precisely by them when effecting the turning or other machining operations. Difficulty has always been experienced heretofore, therefore, in properly supporting an axle in a lathe or other machine tool to machine its fits or bearings.

One object of the present invention is to provide a machine for accurately drilling or milling centering holes in the ends of an axle which may be used subsequently to receive the centers of a lathe or other machine tool to support the axle during turning or other operations on the axle.

Another object of the invention is to provide a machine of the character described which will be automatic in operation and which will precisely drill the centering holes in the ends of the axle to the required depth.

Still another object of the invention is to provide a machine of the character described having safety means preventing drilling of the centering holes if they already have the requisite position and size.

Other objects of the invention will be apparent hereinafter from the specification and from the recital of the appended claims when taken in connection with the accompanying drawings.

While the invention is illustrated specifically in connection with the milling of centering holes in carwheel axles, it will be understood that the invention is not restricted to such use, but is applicable to centering operations on various types of work.

In the machines illustrated the work is held between two pairs of clamps which are spaced axially from one another, and which are positioned to engage and clamp the work between its bearing sections. The axle, which is to be machined, may be lowered from an elevator support, or other conveyor, onto two axially spaced rests so that it lies between the opened jaws of the two pairs of clamps. Each jaw is V-shaped, and the V's of the two jaws of a pair confront one another so that when the opposed jaws of the two pairs are moved toward one another the axle or other workpiece will be raised off the rests and centered with reference to the two drills which are to effect the centering or recentering operation. The two jaws of each pair are moved toward and from one another by an air motor so that the clamping pressure is equalized.

The right and left hand center drill heads are mounted on slidably adjustable supports which are adjustable toward and from each other axially of the work. The two heads are alike. Each has a spindle or quill rotatably journaled in it and adapted to be fed axially by hydraulic pressure. The drills are secured to the two spindles or quills. Inside each quill or spindle is a compression spring which is yieldable to permit limited rearward movement of the drill in the spindle under the pressure of the cut.

In the embodiment of the invention illustrated in FIGS. 1 to 10 inclusive, after the axle has been clamped, the rotating spindles or quills are fed toward and into engagement with the axle. As the cuts progress, the thrust pressure builds up. When the maximum desired thrust is attained, a limit switch will be tripped which actuates a timer that permits the drill to drill long enough to clean up the cut, and then causes the drill head to be retracted clear of the axle. A second limit switch stops the retracting movement when each drill is sufficiently clear of the axle at its end to permit unloading of the axle from the machine and loading of a new axle.

A third limit switch is provided to stop feed movement of the drill spindle or quill when the drill carried thereby enters a hole previously drilled to full size. Obviously in such a circumstance, the compression spring would not be compressed and the first limit switch would not be tripped. The third limit switch is adapted to be tripped by a collar which is adjustable on a rod carried by the associated drill head support. When the third switch is tripped the feed movement of the associated quill or spindle is stopped and the spindle is retracted to loading position.

The embodiment of the invention illustrated in FIGS. 11 to 15 inclusive is particularly intended for use in recentering axles after use and which already have centering holes in their ends. Here two probes are provided which automatically sense the depth and location of the centering holes in the opposite ends, respectively, of axles. Each probe comprises a tapered member adapted to enter one hole in the axle and having a plurality of blocks (three in the embodiment shown) movably mounted on it and positioned in equi-angularly spaced relation to one another about the axis of the probe. Each of these blocks is spring-pressed forwardly and inwardly of the probe axis to engage in the hole of the axle around its periphery. There is a collar slidably mounted on the probe; and this collar carries a limit switch for each block. The probe is ordinarily disposed in inoperative position. When an axle, which is to be recentered, has been clamped in the machine, two arms, which carry the two probe units, respectively, are swung down to the center line of the drills. Then each probe is moved axially toward the axle. As the probe advances its blocks are moved rearwardly and outwardly against the pressure of their springs. When a block has traveled rearwardly a predetermined distance it will trip the limit switch associated therewith. If the hole is properly centered, all three blocks will trip their limit switches simultaneously. If the hole is off-center as regards the axis of the drills, however, one block will trip its limit switch before the two other blocks trip their respective limit switches. In this event the one block, which has tripped its limit switch, will move the collar, which carries the limit switches rearwardly, during further forward travel of the probe. During the forward travel of the probe, through operation of a transducer, a stop is set which controls the subsequent depth of drilling by the drill with which the probe unit is associated. There is a fourth limit switch mounted on the probe. This fourth limit switch is to govern the maximum diameter of the hole to be recentered. If the collar is moved rearwardly far enough to trip this fourth limit switch, before the three limit switches, that are carried by the collar, are tripped, then the hole already in the axle will be oversize, or will be beyond reclaiming (recentering) and through appropriate electrical controls the axle will be removed from the machine (rejected) without any recentering operation being performed thereon, and the probe will be swung out of operative position until another axle is clamped in the machine. Then the probing operation on this other axle will be performed as before. If the three limit switches carried by each collar are tripped, however, before the collars will have moved far enough rearwardly to trip the fourth limit switch associated with each probe unit, the recentering operation will proceed. The probes will be retracted and swung out of the way, and each drill will be fed into the axle to recenter it at its two ends, respectively, the depth of cut being controlled at each end by the associated transducer. The drive to and feed of the drills may be effected in the same way and through the same type mechanism as in the first embodiment of the invention. Again when the drilling operation has been completed the drills will be retracted, the axle will be removed from the machine, and another axle chucked thereon.

Referring first now to FIGS. 1 to 10 inclusive of the drawings, 20 (FIG. 1) denotes the bed of the machine. Mounted on this bed at opposite ends thereof are two supports 21. These are adjustable toward and away from one another on ways 24 of the bed by means of screws 22, which are journaled in brackets 23 that are fastened to the bed 20. Each screw threads into a split nut (not shown) that is secured to the associated support.

Bolted or otherwise fastened to each support is a head 25. Since the two heads are alike in construction only one will be described here in detail.

Each of the heads 25 has a cylinder or chamber 30 (FIG. 3) formed therein which is closed at opposite ends by cap members 31 and 32, respectively. Mounted to reciprocate in each cylinder 30 is a sleeve 34 which has a shoulder intermediate its ends against which is secured a piston 36 by means of bolts 37. The piston 36 has an O-ring sealing member 38 mounted in a groove on its periphery to seal against the contacting wall 39 of the chamber or cylinder 30. The sleeve 34 has an O-ring 40 mounted in a groove in its shoulder to seal against the confronting surface of the piston 36.

Figure 3:
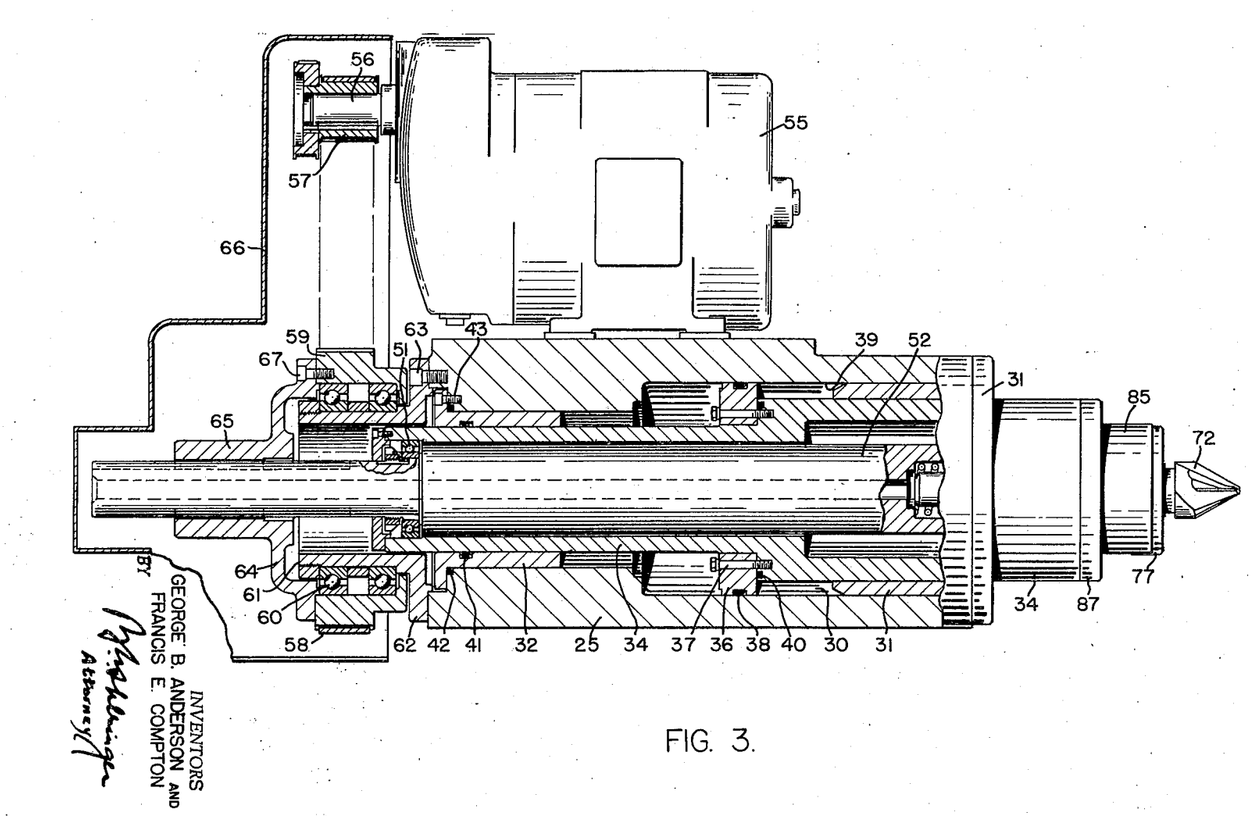
FIG. 3 is a view on a somewhat enlarged scale showing one of the tool heads of this machine, parts being broken away and shown in section.
Figure 4:
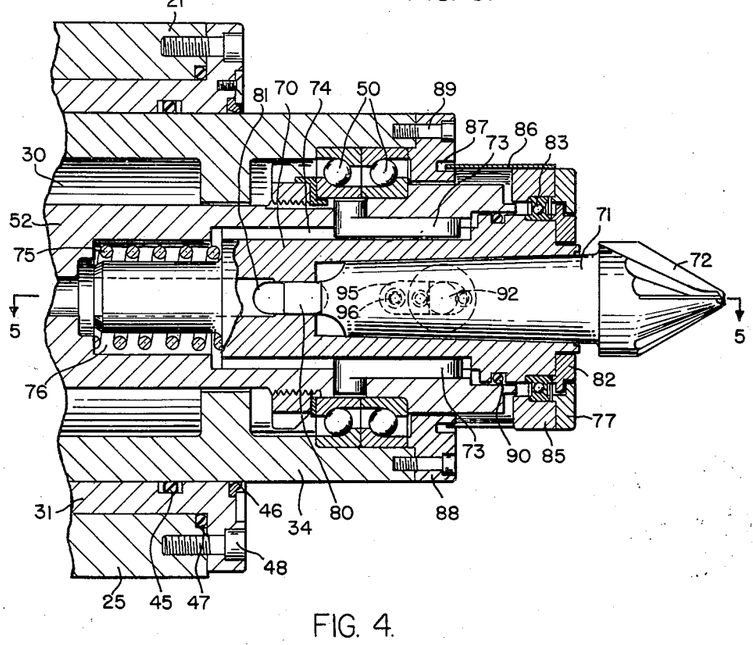
FIG. 4 is a fragmentary axial section on a considerably enlarged scale through the front end of this tool head, the section being taken in the same plane as the section of FIG. 3.

The cap member 32 has an O-ring 41 mounted in an internal groove therein which seals against the sleeve 34. An O-ring 42 is mounted in a groove in the end face of the head 25 to seal against the confronting flange surface of the cap member 32. The cap member 32 is secured to the head 25 by screws 43 which thread into the head.

The cap member 31 has an O-ring 45 (FIG. 4) which engages the periphery of the sleeve 34 to seal against the same. It also carries a ring 46 which acts as a scraper or wiper against the reciprocating sleeve or piston rod 34. An O-ring 47 mounted in a groove in the head 25 seats against the flanged forward end of cap member 31 and further seals against leakage from the cylinder 30. The cap member 31 is secured in place by screws 48.

Journaled by means of antifriction bearings 50 (FIG. 4) and 51 (FIG. 3) in the sleeve or piston rod 34 is a spindle 52. This spindle is adapted to be driven from the gear reduction motor 55, which is mounted on top of the head 25, through the gear reduction, the shaft 56, a pulley 57, which is keyed to this shaft, the belt 58, and the pulley 59. The pulley 59 is journaled on antifriction bearings 60 on the hub 61 of a flanged member 62 which is secured by screws 63 to the rear end of the head 25. Fastened to the pulley 59 is a flanged member 64 that has a hub portion 65, which is internally splined to engage splines on the rear reduced diameter end portion of the spindle 52. The flanged member 64 is secured to the pulley 59 by screws 67.

The spindle 52 is recessed at its front, inner end to receive an adapter 70 (FIG. 4), which has a tapered bore to receive the tapered shank 71 of a conventional end mill or drill 72. The adapter has diametrally opposed longitudinally extending slots 74 which receive the keys 73 by which the adapter is keyed to the spindle 52 to rotate with the spindle but to be movable axially of the spindle. The adapter is of reduced diameter at its inner end, to fit into a counterbore 76 in the spindle 52. Interposed between the bottom of this counterbore and the shoulder formed at the juncture of the small and large diameter portions of the adapter 70 is a coil compression spring 75, which constantly urges the adapter forward in the spindle 52. The adapter is secured in the spindle by a clamping ring 77 which is secured to a collar 85 by screws 78 (FIG. 5).

The drill or end mill 72 is held against rotation relative to the adapter by a tongue 80 on the inner or rear end of the end mill. This tongue is flattened off at opposite sides and engages in a correspondingly shaped slot 81 in the adapter.

Interposed between the adapter and head is a thrust bearing 83, which seats in the collar 85. A guard 86 (FIG. 4) is mounted on the collar 85 in any suitable manner, as by screws, and telescopes into a slot 87 in the front face of the ring 88 which is secured to the sleeve 34 by screws 89. The ring 88 serves to hold the bearings 50 in place. An O-ring 90 is mounted in a peripheral groove in the adapter and engages the confronting inner wall of the sleeve 52.

Figure 5:
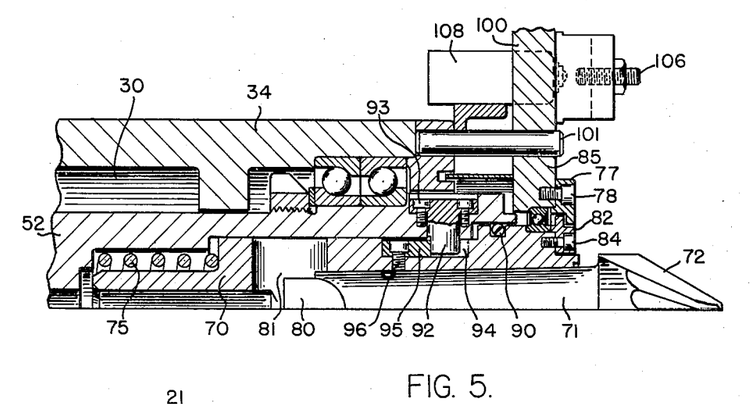
FIG. 5 is a fragmentary section on the line 5—5 of FIG. 4 looking in the direction of the arrows.

The thrust bearing 83 is held in place by a labyrinth collar 82 which cooperates with ring 77 and which is secured to the adapter by screws 84 (FIG. 5).

The forward movement of the adapter and of the centering tool is positively stopped by a stop member 92 (FIG. 5). This stop member is fastened to the spindle 52 by screws 93, and projects radially inwardly to engage in an elongate slot or recess 94 formed in the periphery of the adapter 70. The stop member abuts against a block 95 which is secured to the adapter 70 by a screw 96, to limit the forward movement of the adapter and of the tool mounted therein. The length of the recess 94 is sufficient to permit required rearward movement of the adapter without the stop coming up against the front wall of the recess 94.

Figure 6:
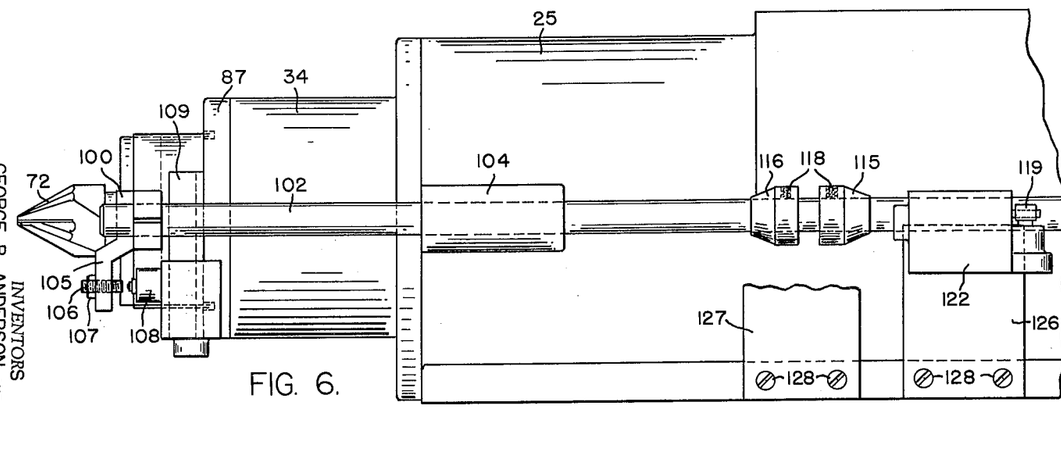
FIG. 6 is a fragmentary side elevation of the tool head looking from the opposite side from FIG. 3.
Figure 7:
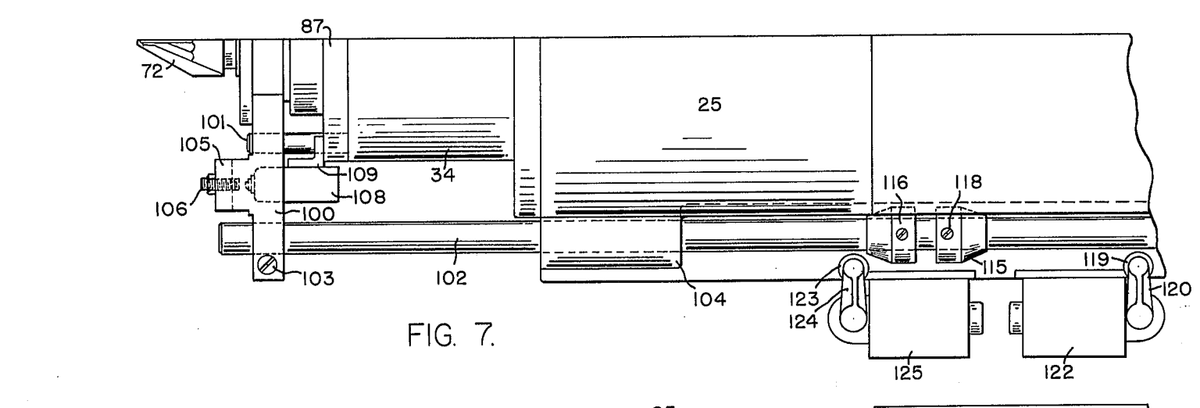
FIG. 7 is a fragmentary plan view of this tool head showing the trip mechanism for controlling the movements of the tool head.

The collar 85 has an extension 100 (FIG. 5) at one side which is formed at its outer end with a split clamp, in which there is secured a trip rod 102 (FIGS. 6 and 7). The trip rod is secured to the projection 100 by tightening up the screw 103. The trip rod is mounted to slide in a guide sleeve 104 which is integral with or fastened to the head 25. The collar 100 is held against rotation relative to the sleeve 34 by a pin 101 (FIGS. 5 and 7), which is secured in the sleeve and which engages in a hole in the collar.

There is an arm 105 extending from the projection 100. This arm carries a stop screw 106 which is adjustably threaded into the arm, and which is locked by a nut 107. The stop screw 106 is adapted to engage the plunger of a limit switch 108. This limit switch is mounted on a bracket 109 which is secured in any suitable fashion to the plate 87 which is fastened to the sleeve 34.

The limit switch 108 trips a timer (not shown) which stops the rapid traverse movement of the sleeve 34 and starts the feed movement of the sleeve which is in the same direction as the rapid traverse movement but at a preselected, slower rate. The drill continues to feed until the timer times out, and starts a second timer. Retraction of drill 72 is then delayed to permit the drill to dwell and clean up the center hole in the workpiece. The screw 106 provides for adjustment of varying amounts of deflection of spring 75 (FIG. 4), thereby allowing alteration in the thrust pressure.

Trip rod 102 (FIGS. 6 and 7) carries two adjustable collars 115 and 116, which are secured to the trip rod by set screws 118. The two collars have conical portions at their opposite, mutually remote ends. One of the collars is adapted to cooperate with the roller 119 carried by the arm 120 of a limit switch 122 to stop the retracting movement of the sleeve 34. The other collar 116 is adapted to cooperate with the roller 123 carried by the arm 124 of the limit switch 125. This limit switch 125 operates to reverse the forward travel of the spindle if the limit switch 108 is not tripped, as would be the case if the axle, which is to be recentered, has a centering hole already in it previously drilled to full size.

The limit switches 122 and 125 are mounted on plates 126 and 127, respectively, which are secured by screws 128 to the head 25.

The work, which is to be centered in the machine, and which may be in the form of an axle A (FIGS. 1 and 8) is adapted to be held between two pairs of gripping jaws. Each pair of jaws comprises two opposed members 130 and 131. Each member 130 and 131 is provided with two hardened gripping blocks 132 that are disposed at an angle to one another to form a V, and that are secured to the members 130 and 131 by screws 133. The gripping portions of the two cooperating jaws are offset from one another as clearly shown in FIGS. 1 and 10. The two jaws of each pair are formed with oppositely-disposed channeled ways 135 (FIG. 9) that engage guide rails 136 formed at opposite sides of a support 137 (FIGS. 1 and 8) which is secured to the base of the machine by bolts that pass through holes 138 in the support and that engage in the T-slots 140 (FIG. 2) in the bed 20 of the machine.

The two members 130 and 131 of each pair of jaws are adapted to be moved toward and away from one another by means of a screw 142 (FIG. 8) which is provided at opposite sides of its longitudinal center with threads of opposite hand that thread, respectively, into nuts 144 and 145 carried by the members 130 and 131, respectively, and keyed thereto. Each screw shaft 142 is journaled at opposite ends in its support 137. The screw shaft may be manually rotated by engagement of a suitable tool with the hex end 148 of the shaft. It is adapted to be power-driven by an air motor 150 through a conventional coupling 151.

A manually-operated push button or an electrically-operated valve starts the air motor 150 to move the two clamping jaws 130 and 131 into clamping position. The motor 150 may be of conventional construction; and when the work is clamped under sufficient pressure by each pair of clamping jaws, the associated motor will stop. When the holes have been drilled to the required size, the operator restarts the air motor in reverse and the clamping jaws will be unclamped. Ordinarily the air motor will run at higher pressure in reverse so that the jaws will disengage rapidly from the work.

When the axle is loaded into the machine it is placed on two longitudinally spaced rests 155 (FIGS. 1, 8, and 10) which are bolted by bolts 156 of the two supports 137. These rests have upper plane faces.

For unloading, an elevator similar to that shown in the co-pending application of William R. Miller, Frederic William Young and Peter Hold, Serial No. 770,347, filed October 29, 1958, may be used to lift the work out of the machine and put it on a conveyor.

160 (FIG. 1) denotes a standard which is bolted or otherwise secured to the base of the machine and which carries an arm 161 from which is suspended a pendant 162 carrying the electrical push-buttons that control the operation of the machine. For manual operation of the clamping jaws 130 and 131 a valve 165 is provided which is secured on a bracket 166 that is bolted or otherwise fastened to the base of the machine. Valve 165 may be operated by a lever 167. It controls operation of the air motors 150 (FIGS. 8 and 10) that actuate the clamping jaws.

The hydraulic motive fluid for moving spindle 34 (FIGS. 3 and 4) will be supplied from a pump 172 (FIG. 2) driven from the motor 55 (FIG. 3), or by an individual pump drive motor. The direction of flow of the hydraulic motive fluid to a cylinder 30 may be controlled by conventional solenoid-operated valves. When the operator pushes the manually-operated electrical cycle start button of the machine solenoids are energized to shift the directional control valve for each cylinder 30 to the position in which the hydraulic motive fluid will flow to the outer side (left hand side as viewed in FIG. 3) of the associated piston 36 to move the associated sleeve 34 inwardly to bring the associated drill 72 into engagement with the work. When the associated limit switch 108 (FIGS. 6 and 8) is tripped, a timer is started. The timer may then permit the tool to continue to feed in for a predetermined length of time; and when this timer has run down, it may start another timer, permitting the tool to dwell and clean up the center hole. When the second timer times out, the directional control valve is shifted to put the outer side of associated piston 36 on exhaust and its inner face on supply to withdraw the tool to inoperative position. When limit switch 122 (FIG. 7) is tripped, the retracting movement stops.

The machine is equipped with a coolant pump 170 (FIG. 2) for supplying coolant to the tools and work at the points of their engagement.

The operation of the machine illustrated will be understood from the preceding description but may be summed up briefly here.

Figure 1:
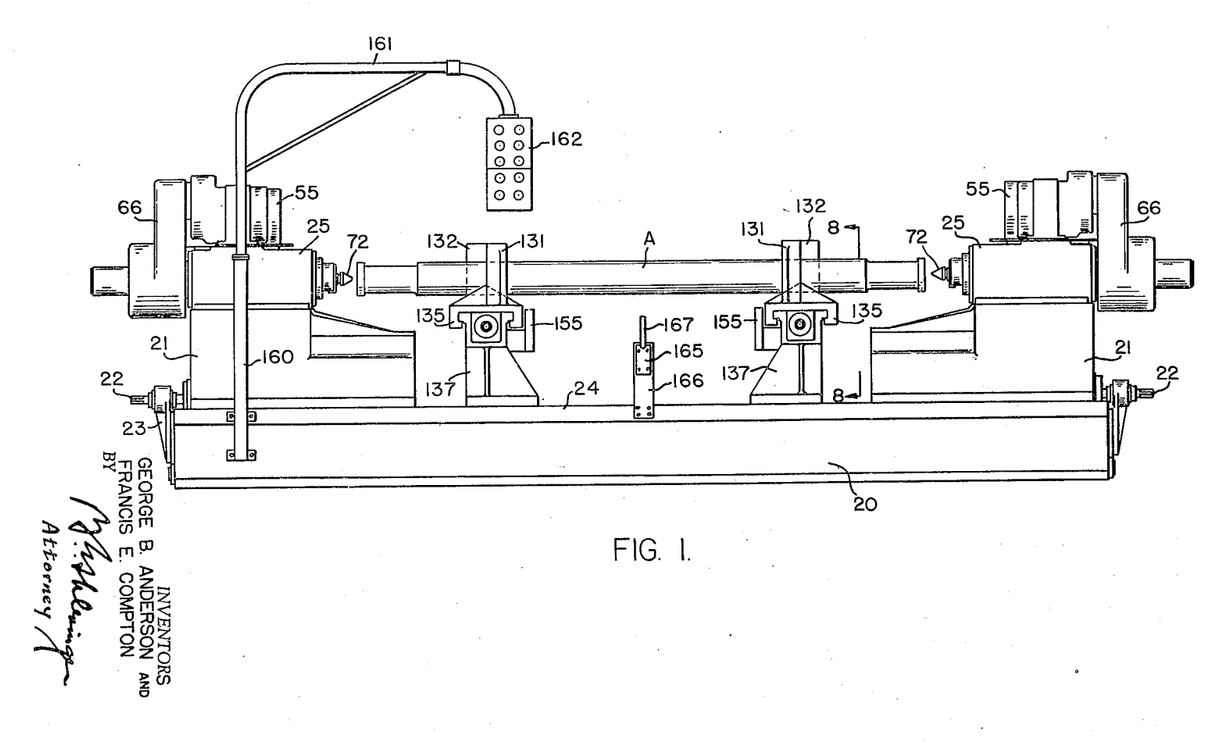
FIG. 1 is a side elevation of a machine built according to one embodiment of this invention.
Figure 2:
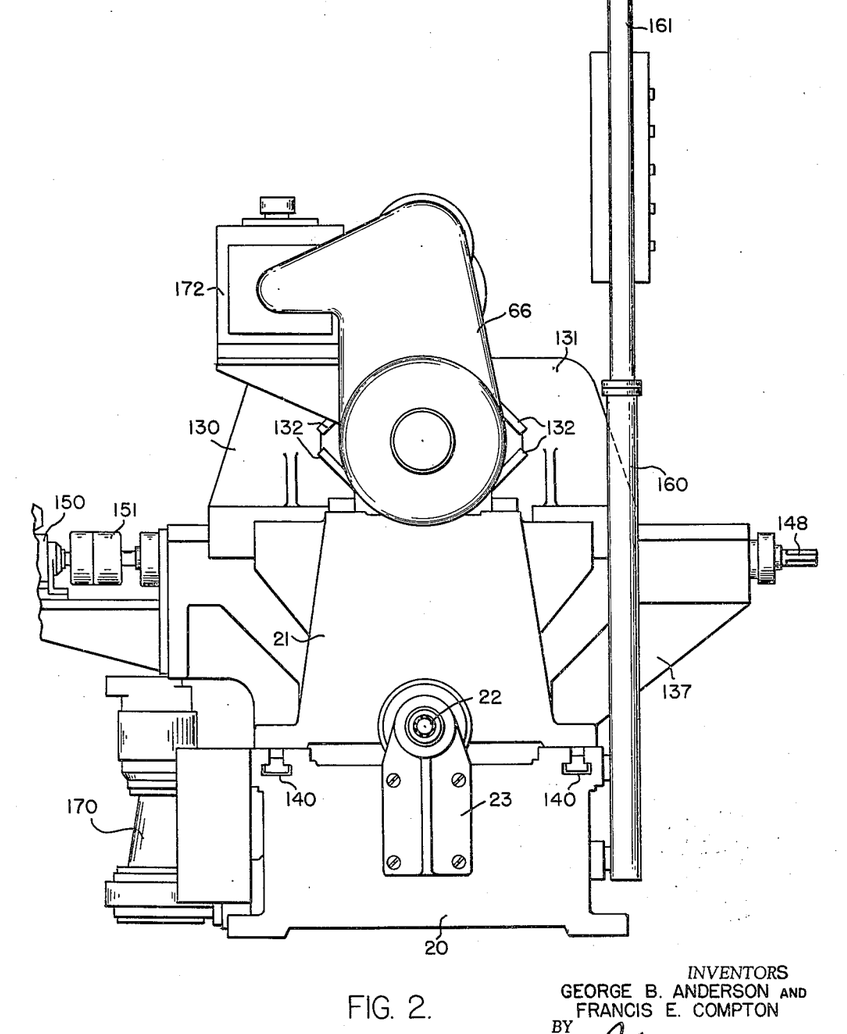
FIG. 2 is an end view of this machine on an enlarged scale.
Figures 8, 9, 10:
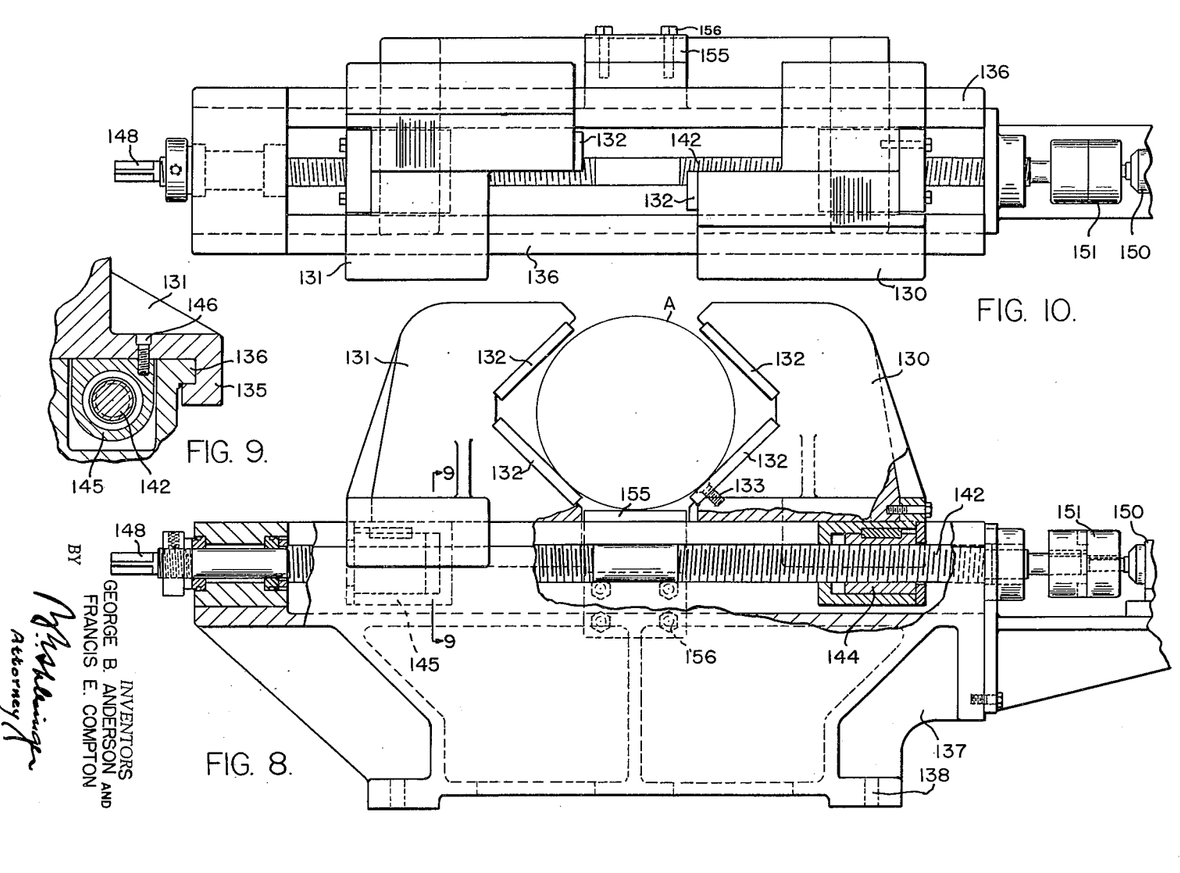
FIG. 8 is a section on an enlarged scale taken on the line 8—8 of FIG. 1 looking in the direction of the arrows.
FIG. 9 is a fragmentary section on the line 9—9 of FIG. 8 looking in the direction of the arrows.
FIG. 10 is a plan view of the parts shown in FIG. 8.

The axle A to be centered or recentered may be loaded onto an elevator such as shown in the Miller, Young and Hold application above mentioned, which will lower the axle onto the rests 155 (FIGS. 1 and 8). The air motors 150 are then actuated to move the jaws 130, 131 of two pairs of equalizing clamps toward one another. The lower plates 132 of the jaws will engage under the axle and lift it up, and the V's formed by the plates 132 will center the axle approximately in alignment with tools 72.

After the axle has been clamped the operator will press the starting button to cause the drill spindles 52 to be fed forwardly by hydraulic pressure on the outer faces of the pistons 36 of the two heads 25. The forward movement of the spindles and the pressure of the drills and their adapters 70 back against the springs 75 (FIG. 4) will bring screws 106 (FIG. 5) into engagement with limit switches 108; and these switches will be tripped, to start a timer for a period during which a slow feed takes place, at the end of which another timer is tripped to control the dwell for cleaning up. In either case at the end of the dwell for clean up of the centering holes, the valve, which controls the direction of movement of each piston 36 is reversed, and the tools are retracted until limit switches 122 (FIGS. 6 and 7) are tripped. Then this retracting movement is stopped.

Then the elevator may be raised until the workpiece rests on it, and the clamping jaws may be withdrawn by reversal of the air motors 150 (FIG. 1 and 8). The elevator may then continue its upward movement to carry the axle onto a conveyor for movement for instance to a turning machine, or for further operation thereon.

As previously stated, collar 116 (FIGS. 6 and 7) and limit switch 125 are provided as safety devices to prevent feed of the tools into the axle beyond a predetermined amount. Thus, if an axle already has a centering hole of the required size, feed of the tool into the axle will be stopped before the tool starts to cut.

The machine illustrated in FIGS. 11 to 15 inclusive is basically like that shown in FIGS. 1 to 10 inclusive; and only enough of the embodiment of FIGS. 11 to 15 inclusive is illustrated to show its structure and operation and how it differs in structure and operation from the embodiment of FIGS. 1 to 10 inclusive. Identical parts in the two embodiments are designated by the same reference numerals.

The bed 220 (FIGS. 11 to 15) is similar to bed 20 (FIGS. 1 to 10) and carries at opposite ends two supports 221 (only one of which is shown), similar to supports 21, which are movable on the bed toward and away from one another by screws 222, similar to screws 22. Each screw 222 is journaled in a bracket 223 and threads into a split nut (not shown) that is secured in the associated support 221. Each screw 222 may be driven from a hydraulic motor 250 through a worm 251 and a wormwheel 252. There is a wormwheel 252 secured to each screw 222. Each motor 250 is supported from bed 220 by a bracket 254.

Bolted or otherwise fastened on each support 221 is a head 25. These heads may be identical to the head 25 already described having a spindle 52 (FIG. 3) journaled therein in a sleeve 34 to which a piston 36 is secured for moving the spindle axially, the spindle in turn carrying a spring-pressed adapter which is movable axially of the spindle, and in which a drill 72 is secured coaxially with the spindle. The spindles 52 may be driven from motors 55 exactly in the manner previously described.

The work, axle A, may be supported and clamped in exactly the same manner as previously described and as illustrated specifically in FIGS. 8, 9 and 10.

Pivotally mounted by means of a pin 255 on a bracket 256 which projects from one side of each support 221 (FIGS. 11 and 12), however, is a cylinder 257. Each cylinder 257 has a piston (not shown) reciprocable therein which has a piston rod 258 secured to it. Each piston rod 258 is pivotally connected by means of a pin 259 with the forked arm 261 of a bell-crank 260 whose other arm is denoted at 262.

Each bell-crank 260 is rockably mounted intermediate its ends on a shaft 264 that is rotatably and reciprocably mounted in a pair of arms 265 and 266 that are integral with each support 221 and that project laterally and upwardly therefrom. Rocking movement of each shaft 264 and its associated bell crank 260 is effected by movement of the associated piston in its cylinder 257; while axial reciprocating movement of each shaft 264 is effected by reciprocation of a piston (not shown) in a cylinder 268 that is fastened to the associated arm 266. Each such piston is connected to its associated shaft 264 by its piston rod 269 that is threaded into one end of the shaft.

Mounted on the other arm 265 of each support is a conventional electrical transducer 270. This transducer is operated by shaft 264, the shaft having a button or boss on the end, which is opposed to the transducer, to engage the transducer rod 272.

Secured in the free end of each bell-crank arm 262 is a probe 275. Each probe comprises a cylindrical bar 276 (FIG. 14) which has a conical front end 277 that is adapted to enter the conical centering hole H in the adjacent end of the axle A which is to be recentered. Mounted on the periphery of the conical portion 277 of each probe to slide in guide slots 278 therein, that are inclined to the center line 279 of the probe at the cone angle of the conical portion 277, are a plurality of blocks 280. Each block 280 is constantly urged forward along its guide slot 278 by a coil spring 283 which is mounted in a recess 281 in the head 277 of the probe. Each spring 283 is interposed between the rear end of its recess 281 and a lug 284 that projects inwardly from the associated block 280 into the recess. The spring surrounds a rod 285 that projects rearwardly from the associated lug 284.

Each block 280 has a lug 287 integral with it and projecting outwardly from the body of the block. The lugs 287 are adapted to engage the plungers of and to trip limit switches 290. There are three of these limit switches 290 in each probe unit in the embodiment of the invention shown; and the three of the limit switches 290 of a probe unit are mounted in equiangularly spaced relation on a collar 292 that is slidable axially of the bar 276.

Secured to each bar 276 against movement relative thereto is a second collar 293. Each collar 293 carries a limit switch 295 whose plunger projects forwardly to be tripped by the associated collar 292 should the associated collar 292 be moved rearwardly beyond a predetermined position on the associated bar 276. A set-screw 296 secures each collar 293 in position on its bar 276. A coil spring 297, which is interposed between associated collars 292 and 293, constantly urges collar 292 forwardly away from collar 293. A pin 298, which is secured in collar 297, and which engages in groove 299 in the associated bar 296, limits the forward movement of collar 292 on the bar.

When the probe is in probing position the initial part of its movement toward the opposed face of the axle is effected by movement of the carriage or support 221 on which the probe unit is mounted.

Figure 11:
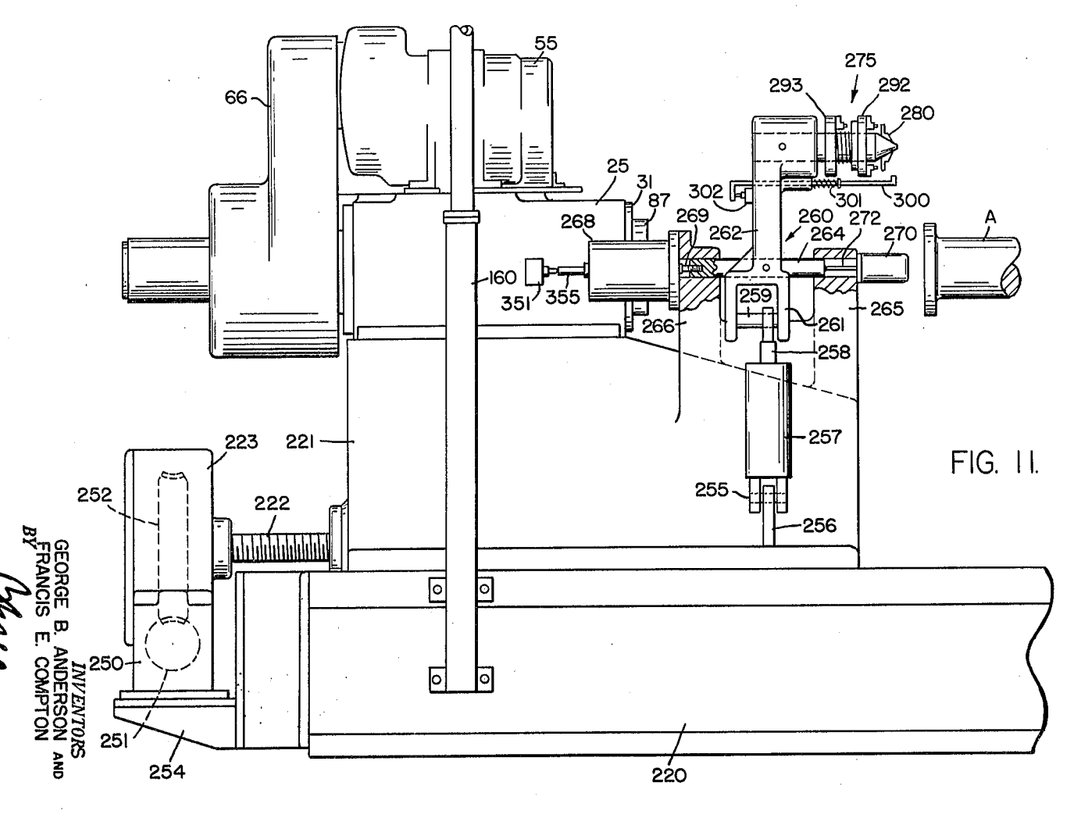
FIG. 11 is a fragmentary side elevation on an enlarged scale of a machine built according to another embodiment of this invention, parts being broken away and shown in section.

Slidably mounted on the arm 262 of each bell-crank 260 is a rod 300 which has an upturned forward end and a downturned rear end. The forward end of each rod 300 is positioned to engage the opposed end face of the axle A when the probe has been swung into probing position and the probe has been moved far enough forward by support 221. A coil spring 301, which surrounds each rod 300 and which is interposed between the arm 262 of the bell crank and a shoulder on rod 300, constantly urges the rod forwardly to cause its rear end to engage and trip a limit switch 302 that is mounted on the back face of the arm 262. As long as the downturned rear end of the rod 300 is in engagement with the plunger of limit switch 302 the carriage or support 221 continues to move forwardly; but when the front end of rod 300 engages the axle A, the downturned rear end of rod 300 is moved away from the associated limit switch 302, releasing that limit switch. This stops the forward movement of the carriage or support 221. Further forward movement of the probe is then under actuation of the piston in associated cylinder 268 (FIG. 11).

Figure 12:
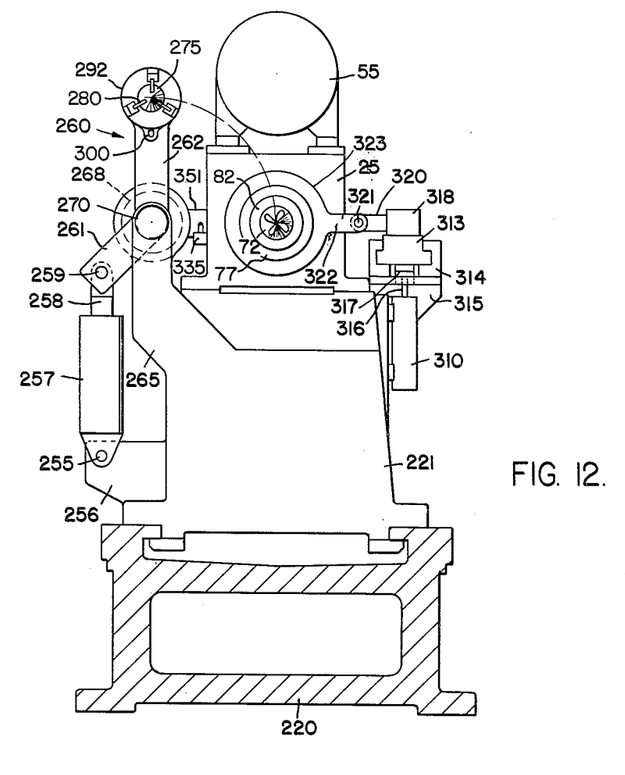
FIG. 12 is an end view of this embodiment of the invention.
Figure 13:
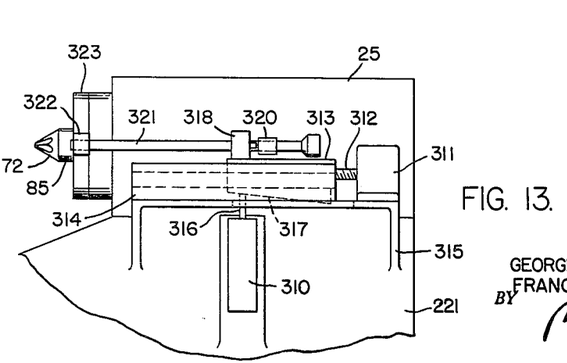
FIG. 13 is a side elevation of one of the recentering drills of this machine showing its mounting and the means for determining the limit of the axial recentering movement of the drill.
Figure 14:
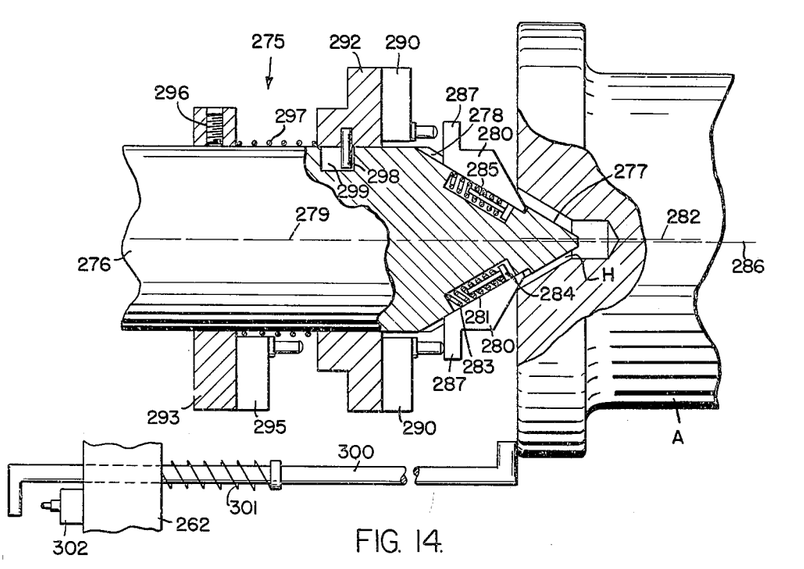
FIG. 14 is a fragmentary view on an enlarged scale of one of the probes of this machine, parts being broken away and shown in section.

Mounted on the side of each carriage or support 221, opposite that on which cylinder 257 is mounted, is a conventional transducer 310 (FIGS. 12 and 13). Each transducer 310 has an electric motor 311 associated with it which is adapted to drive a screw 312 to adjust a block 313 forward or back in a guide way 314 that is mounted on a bracket 315 integral with or secured to carriage 221. Each block 313 has an inclined lower face 317 that engages and rides on the upper end of the rod 316 of the associated transducer 310. Each block 313 carries a microswitch 318 which is positioned to be tripped by a stop lug 320. Each stop lug 320 is secured to and projects laterally from a rod 321 that is fixedly fastened at one end in an arm 322 of a ring 323 that is secured to the ring 85 (FIG. 4) in place of stop 106 (FIG. 5).

Limit switch 318 eliminates any need for limit switch 108 (FIG. 5) and takes the place of same. Each limit switch 318 (FIG. 13) is positioned by associated motor 311 during movement of its associated probe unit 275 and determines the limit of forward movement of the associated sleeve 34 (FIG. 3) that is, of the associated drill 72 in the recentering operation.

Transducer 310 is connected with one terminal of a Wheatstone bridge circuit, and the associated transducer 270 is connected with another terminal of that circuit. Thus, as rod 272 of transducer 270 is moved, the transducer will vary the resistance on one side of the Wheatstone bridge. Motor 311 runs until transducer 310 counterbalances transducer 270 in the Wheatstone bridge circuit.

Figure 15:
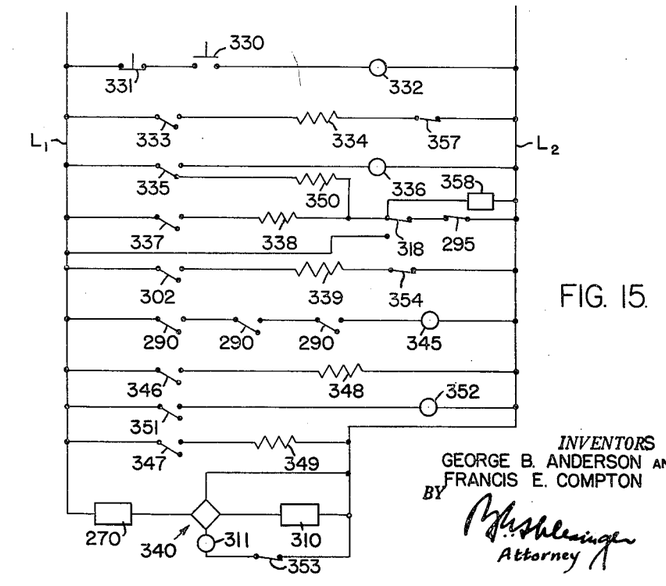
FIG. 15 is an electrical diagram showing one way in which this machine may be wired to accomplish its purpose.

One way in which each probe and drill unit is wired to accomplish its purpose is shown in FIG. 15.

In operation, when the start button 330 is manually closed a circuit will be made from main line $L_1$ through normally-closed stop button 331, now-closed start button 330 and a relay coil 332 to main line or ground $L_2$. This causes relay coil 332 to be energized which closes the normally-open switch arm 333 of the relay. This closes a circuit to the solenoid 334 of a solenoid valve (not shown) which controls flow of the hydraulic actuating fluid to the associated cylinder 257 (FIGS. 11 and 12). This causes the associated bell crank 260 to be moved to swing the associated probe 275 until its center line 279 aligns with the center line 286 of the workpiece (axle A).

When the probe center line 279 is in alignment with the center line or axis 286 of the axle, a limit switch 335 (FIGS. 12 and 15) is contacted and shifted from its normal position shown in FIG. 15 to a position wherein it closes a circuit to the coil 336 of a relay, causing the normally-open switch arm 337 of this relay to be closed. This energizes the solenoid 338 of a solenoid valve (not shown) that controls the direction of operation of the associated pump 250 (FIG. 11), the circuit being made from main line $L_1$ through the now-closed relay arm 337, solenoid 338, limit switch 318 (FIGS. 13 and 15), and limit switch 295 (FIGS. 14 and 15), to main line or ground $L_2$. The solenoid-operated valve is shifted in such direction to advance the associated carriage 221 and associated probe 275 toward the axle A.

When the probe unit has advanced far enough for the upturned forward end of each rod 300 (FIGS. 11 and 14) to hit the axle A, the rearward downturned end of the rod is moved away from the normally-closed limit switch 302 which has previously been held open by action of spring 301 (FIG. 11) holding the downturned rear end of the rod in engagement with the plunger of this limit switch. The respective limit switch 302 therefore closes. This energizes the solenoid coil 339 of a solenoid-operated valve (not shown) that controls the direction of movement of the piston in associated cylinder 268 (FIG. 11), the circuit being made through the normally-closed switch arm 354 of a relay whose coil is denoted at 345. This causes the hydraulic motive fluid to be applied to this piston in such way as to move the associated probe carrier 260 and probe forward toward the axle A.

The transducer 270 is connected with one terminal of a Wheatstone bridge 340; and the transducer 310 is connected with the opposite terminal of this bridge. Motor 311 is connected with still another terminal of the bridge. Thus as plunger 272 (FIG. 11) of the transducer 270 is moved during movement of the associated probe 275, the transducer 270 will be actuated to vary the resistance on one side of the Wheatstone bridge 340, and the motor 311 will be actuated to move block 311 (FIG. 13) and rod 316 until balance is obtained in the Wheatstone bridge circuit. This will position limit switch 318 which determines the limit of feed movement of the associated drill 72.

The forward movement of each probe unit 275 continues until all three blocks 280 have engaged the adjacent hole H (FIG. 14) which is to be recentered, or until the associated collar 292 has been moved rearwardly far enough to trip limit switch 295.

If all three blocks 280 contact the wall of the hole H before the collar 292 has moved far enough rearwardly to trip limit switch 295, all three normally-open limit switches 290 will be closed, thereby establishing a circuit to relay coil 345. This will open relay arms 353 and 354. Opening of relay arm 354 will deenergize the solenoid-operated valve above referred to, which controls the direction of movement of the piston in the associated cylinder 268 (FIG. 11); and this solenoid-operated valve, will be shifted in such direction as to cause the associated probe carrier 260 to be retracted. Opening of relay arm 353 will stop motor 311 that has set limit switch 318. The retracting movement of the probe carrier 260 is, of course, effected by the piston (not shown) which reciprocates in cylinder 268 (FIG. 11). This piston has a piston rod 355 projecting from its rear end. When the piston has retracted the probe carrier, piston rod 355 closes a normally-open limit switch 351. This closes a circuit to a relay coil 352, which, when energized, opens relay arm 357. This breaks the circuit to relay coil 334, reversing the flow of the hydraulic motive fluid to cylinder 257. This causes the probe 275 to be swung away to its inoperative position shown in FIG. 12.

When the probe unit clears the axle, associated spring 301 (FIG. 11) will snap associated rod 300 forward, causing the downturned rear end of the rod to again open switch 302. Of course, when the probe carrier 260 is retracted, the limit switches 290 are released, as is also the limit switch 295 if it had been closed.

When the probe unit swings away to inoperative position, the limit switch 335 (FIGS. 12 and 15), which is a double-throw switch, returns to its normal position which closes a circuit to solenoid coil 350 of a solenoid-operated valve that controls the direction of flow of the motive fluid to the associated cylinder 30; and the pressure fluid is applied to the rear of piston 36 to advance the associated drill 72.

The rotating drill 72 therefore is fed into the work, cleaning up the adjacent centering hole H. The feed movement of the drill continues until associated stop 320 (FIG. 13) strikes the normally-closed limit switch 318, opening that switch. This breaks the circuit to the solenoid coils 350 and 338 of the solenoid-operated valves that control, respectively, flow in one direction of the motive fluid to cylinder 30, and one direction of operation of the pump. It also starts the timer 358. The timer permits dwell of the spindle to clean up the recentered hole, and then times out. When it times out, the relay arms 346 and 347 of the timer are closed. This makes circuits to the reverse solenoid coils 348 and 349 of the solenoid valves that control, respectively, flow in the reverse direction of the motive fluid to the cylinder 30, and the reverse direction of operation of pump 250. Thus, the piston 36 and associated drill 72 are retracted, as is also carriage 221.

Limit switch 295 (FIGS. 13 and 15) operates as a safety device. Thus, if the hole H has been so worn, or has its center line 282 so far eccentric of the axis 286 of the axle A, that it is impractical to clean it up, or if through some oversight an axle has been placed in the machine which has already been recentered, and therefore requires no further cleaning up, the collar 292 will be moved rearwardly, by engagement of one or two of blocks 280 with the edge of the hole H before all three of the blocks contact the edge, far enough to trip limit switch 295. This will break the circuit to coils 350 and 338 and the associated head 25 and carriage 221 will be retracted, so that no drilling operation on the workpiece will be effected.

While the invention has been described in connection with two different embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described our invention, what we claim is:

1. A machine for recentering axles and the like comprising a work support for holding a workpiece, a tool head, a tool carrier reciprocable in said tool head toward and from the workpiece, a tool spindle rotatably journaled in said carrier, a tool mounted thereon to rotate therewith, means for reciprocating said carrier to feed the tool into and to retract it from the workpiece, means for rotating said spindle, adjustable means for stopping the feed movement of said carrier, and means for adjusting said adjustable stop means comprising a probe adapted to be engaged with the workpiece.

2. A machine for recentering axles and the like as claimed in claim 1 wherein said probe is mounted to be movable axially of said tool spindle toward the workpiece and wherein said adjusting means includes also means operated by said probe in its movement toward the workpiece for adjusting said stop means.

3. A machine for recentering axles and the like according to claim 2 wherein said probe comprises a generally conical member for insertion into the centering hole of an axle or the like, a plurality of detector members slidably mounted on said conical member in angularly spaced relation about the axis of said member, said detector members being disposed to engage with the edge of said centering hole, spring means for urging each of said detector members forwardly on said conical member, and means for stopping the forward movement of said probe toward said workpiece when all of said detecting members engage said centering hole.

4. A machine for recentering axles and the like according to claim 3 having means for also stopping movement of said probe toward said workpiece when said probe has been moved forwardly a predetermined distance without all of said detecting members engaging said centering hole.

5. A machine for recentering axles and the like comprising a work support for holding a workpiece, a tool head, a tool carrier reciprocable in said tool head toward and from the workpiece, a tool spindle rotatably journaled in said carrier, a tool mounted thereon to rotate therewith, means for reciprocating said carrier to feed the tool into and to retract it from the workpiece, means for rotating said spindle, adjustable means for stopping the feed movement of said carrier, and means for adjusting said adjustable stop means comprising a probe adapted to be engaged with the workpiece, means for moving the probe axially of the tool spindle toward the workpiece, means operated by the probe in its movement for adjusting said stop means, and means for stopping said movement of the probe when said probe has been moved a predetermined distance toward the workpiece.

6. A machine for recentering axles and the like as claimed in claim 5 having means operative, upon stopping of the forward movement of said support, for swinging said probe out of alignment with said tool spindle, for retracting said support, and for actuating said carriage to move it forward to feed the tool into the workpiece.

7. A machine for recentering axles and the like comprising a work support for holding a workpiece, a base, a carriage movable on said base toward said workpiece for probing and recentering operations, a tool spindle rotatably mounted on said carriage, a tool mounted on said spindle to rotate therewith, means for reciprocating said carriage, a support pivotally mounted on said carriage and movable axially of its pivotal axis, a probe mounted on said support, means for rocking said support on its pivot to swing said probe into and out of axial alignment with said tool spindle, means for moving said carriage toward said workpiece when said probe is in axial alignment with said tool spindle, detecting means mounted on said support, means for stopping the movement of said carriage toward the workpiece when said detecting means engages the workpiece, means for thereupon moving said support to move said probe independently of said carriage toward said workpiece, separate adjustable stop means for stopping the movement of said carriage toward the workpiece during a recentering operation, means operated by said probe during movement of said support for adjusting the last-named separate stop means, and means for stopping the forward movement of said support toward the workpiece when said probe has moved forward to a predetermined position.

References Cited in the file of this patent

UNITED STATES PATENTS

| | | |
|---|---|---|
| 2,084,562 | Schafer | June 22, 1937 |
| 2,126,175 | Dalcher | Aug. 9, 1938 |
| 2,324,727 | Shartle | July 20, 1943 |
| 2,701,482 | Otto | Feb. 8, 1955 |
| 2,857,789 | Robinson | Oct. 28, 1958 |